United States Patent
Bahar et al.

(10) Patent No.: US 9,986,189 B2
(45) Date of Patent: May 29, 2018

(54) PIXEL SENSORS AND IMAGING DEVICES FOR PROVIDING MULTIPLE SUB SAMPLE IMAGES WITHIN A SINGLE FRAME

(71) Applicant: Samsung Electronics Co., Ltd, Suwon-si, Gyeonggi-do (KR)

(72) Inventors: Mickey Bahar, Ramat Gan (IL); David Dror Dahan, Sitriya (IL)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 38 days.

(21) Appl. No.: 14/987,112

(22) Filed: Jan. 4, 2016

(65) Prior Publication Data

US 2017/0195606 A1 Jul. 6, 2017

(51) Int. Cl.
*H04N 5/225* (2006.01)
*H04N 5/378* (2011.01)
*H04N 5/376* (2011.01)

(52) U.S. Cl.
CPC ......... *H04N 5/3765* (2013.01); *H04N 5/2253* (2013.01); *H04N 5/2254* (2013.01); *H04N 5/378* (2013.01)

(58) Field of Classification Search
CPC .... H04N 5/3765; H04N 5/378; H04N 5/2253; H04N 5/2254
See application file for complete search history.

(56) References Cited

U.S. PATENT DOCUMENTS

| | | | |
|---|---|---|---|
| 6,380,986 B1 | 4/2002 | Minami et al. | |
| 6,574,370 B1 | 6/2003 | Kazayama et al. | |
| 8,194,930 B2 | 6/2012 | Jeon et al. | |
| 8,306,362 B2 | 11/2012 | Compton | |
| 8,773,562 B1* | 7/2014 | Fan | H01L 27/14643 250/208.1 |
| 2009/0128653 A1* | 5/2009 | Tanaka | H04N 5/365 348/222.1 |
| 2011/0205411 A1* | 8/2011 | Voronov | H04N 5/341 348/294 |
| 2012/0104232 A1 | 5/2012 | Hwang | |
| 2013/0243091 A1 | 9/2013 | Ye et al. | |
| 2014/0055635 A1 | 2/2014 | Seo | |
| 2015/0015747 A1* | 1/2015 | Hizi | H04N 5/3591 348/241 |
| 2015/0350583 A1* | 12/2015 | Mauritzson | H04N 5/378 250/208.1 |

FOREIGN PATENT DOCUMENTS

| | | | |
|---|---|---|---|
| JP | 2006217449 A | 8/2006 | |
| JP | 2008085674 A | 4/2008 | |
| KR | 20110057453 A | 6/2011 | |
| KR | 20110062448 A | 6/2011 | |

* cited by examiner

*Primary Examiner* — Hung Lam
(74) *Attorney, Agent, or Firm* — Harness, Dickey & Pierce, P.L.C.

(57) ABSTRACT

A pixel array includes a plurality of pixels arranged in a plurality of rows and a plurality of columns; and a group control line connected to each pixel of a first group of pixels from among the plurality of pixels, the first group of pixels including pixels from at least two different rows from among the plurality of rows, the first group of pixels each being configured to begin an exposure period based on a first signal received from the group control line, the exposure period being a period during which a pixel accumulates charges in response to light incident on the pixels.

20 Claims, 6 Drawing Sheets

FIG. 4

Readout Order

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| <0> | 0 | 1 | 2 | 3 | 4 | 5 | 6 | 7 | 8 | 9 | 10 | 11 | 12 | 13 | 14 | 15 |
| <1> | 0 | 1 | 2 | 3 | 4 | 5 | 6 | 7 | 8 | 9 | 10 | 11 | 12 | 13 | 14 | 15 |
| <2> | 0 | 1 | 2 | 3 | 4 | 5 | 6 | 7 | 8 | 9 | 10 | 11 | 12 | 13 | 14 | 15 |
| <3> | 0 | 1 | 2 | 3 | 4 | 5 | 6 | 7 | 8 | 9 | 10 | 11 | 12 | 13 | 14 | 15 |
| <SPECIAL_TX1> | 0 | 1 | 2 | 3 | 4 | 5 | 6 | 7 | 8 | 9 | 10 | 11 | 12 | 13 | 14 | 15 |
| <SPECIAL_TX2> | 0 | 1 | 2 | 3 | 4 | 5 | 6 | 7 | 8 | 9 | 10 | 11 | 12 | 13 | 14 | 15 |
| <4> | 0 | 1 | 2 | 3 | 4 | 5 | 6 | 7 | 8 | 9 | 10 | 11 | 12 | 13 | 14 | 15 |
| <5> | 0 | 1 | 2 | 3 | 4 | 5 | 6 | 7 | 8 | 9 | 10 | 11 | 12 | 13 | 14 | 15 |
| <6> | 0 | 1 | 2 | 3 | 4 | 5 | 6 | 7 | 8 | 9 | 10 | 11 | 12 | 13 | 14 | 15 |
| <7> | 0 | 1 | 2 | 3 | 4 | 5 | 6 | 7 | 8 | 9 | 10 | 11 | 12 | 13 | 14 | 15 |
| <SPECIAL_TX1> | 0 | 1 | 2 | 3 | 4 | 5 | 6 | 7 | 8 | 9 | 10 | 11 | 12 | 13 | 14 | 15 |
| <SPECIAL_TX2> | 0 | 1 | 2 | 3 | 4 | 5 | 6 | 7 | 8 | 9 | 10 | 11 | 12 | 13 | 14 | 15 |
| <8> | 0 | 1 | 2 | 3 | 4 | 5 | 6 | 7 | 8 | 9 | 10 | 11 | 12 | 13 | 14 | 15 |
| <9> | 0 | 1 | 2 | 3 | 4 | 5 | 6 | 7 | 8 | 9 | 10 | 11 | 12 | 13 | 14 | 15 |
| <10> | 0 | 1 | 2 | 3 | 4 | 5 | 6 | 7 | 8 | 9 | 10 | 11 | 12 | 13 | 14 | 15 |
| <11> | 0 | 1 | 2 | 3 | 4 | 5 | 6 | 7 | 8 | 9 | 10 | 11 | 12 | 13 | 14 | 15 |
| <SPECIAL_TX1> | 0 | 1 | 2 | 3 | 4 | 5 | 6 | 7 | 8 | 9 | 10 | 11 | 12 | 13 | 14 | 15 |
| <SPECIAL_TX2> | 0 | 1 | 2 | 3 | 4 | 5 | 6 | 7 | 8 | 9 | 10 | 11 | 12 | 13 | 14 | 15 |
| <12> | 0 | 1 | 2 | 3 | 4 | 5 | 6 | 7 | 8 | 9 | 10 | 11 | 12 | 13 | 14 | 15 |
| <13> | 0 | 1 | 2 | 3 | 4 | 5 | 6 | 7 | 8 | 9 | 10 | 11 | 12 | 13 | 14 | 15 |
| <14> | 0 | 1 | 2 | 3 | 4 | 5 | 6 | 7 | 8 | 9 | 10 | 11 | 12 | 13 | 14 | 15 |
| <15> | 0 | 1 | 2 | 3 | 4 | 5 | 6 | 7 | 8 | 9 | 10 | 11 | 12 | 13 | 14 | 15 |
| <SPECIAL_TX1> | 0 | 1 | 2 | 3 | 4 | 5 | 6 | 7 | 8 | 9 | 10 | 11 | 12 | 13 | 14 | 15 |
| <SPECIAL_TX2> | 0 | 1 | 2 | 3 | 4 | 5 | 6 | 7 | 8 | 9 | 10 | 11 | 12 | 13 | 14 | 15 |

PIXEL SENSORS AND IMAGING DEVICES FOR PROVIDING MULTIPLE SUB SAMPLE IMAGES WITHIN A SINGLE FRAME

BACKGROUND

1. Field

At least some example embodiments of the inventive concepts relate generally to pixel arrays, image sensors including pixel arrays, and methods of operating the same.

2. Related Art

In complementary-metal-oxide-semiconductor (CMOS) image sensors operating with electronic rolling shutter, artifacts may be observed in an image of a captured scene when the captured scene includes objects moving relatively fast. This is due to the different exposure times of different pixels of the image sensor. To address this issue, a global shutter may be used. In some conventional image sensors using global shutter, the exposure times of all pixels in the image sensor array completely overlap.

In larger sensor arrays, it may be difficult or, alternatively, impossible to read out at the same time. As a result, pixel readout is performed in a rolling fashion. In some conventional rolling shutter CMOS image sensors, the sensor provides a full image (i.e., frame) which is composed of lines which have been read out one by one, in a rolling manner. In conventional image signal processors, there are several algorithms which rely on readout frame statistics to make decisions for next frame parameters (e.g. Auto exposure, Auto Flicker, Auto Focus). In these algorithms one may analyze the pixel characteristics of a current frame in order to determine whether or not parameters are to be changed for a next frame.

SUMMARY

According to at least one example embodiment of the inventive concepts, a pixel array includes a plurality of pixels arranged in a plurality of rows and a plurality of columns; and a group control line connected to each pixel of a first group of pixels from among the plurality of pixels, the first group of pixels including pixels from at least two different rows from among the plurality of rows, the first group of pixels each being configured to begin an exposure period based on a first signal received from the group control line, the exposure period being a period during which a pixel accumulates charges in response to light incident on the pixels.

The pixel array may further include a plurality of column lines corresponding to the plurality of columns, respectively, the plurality of column lines being configured to output image data received from pixels of the columns to which the plurality of column lines correspond.

The pixel array may be arranged such that no two pixels from among the first group of pixels are included in a same column from among the plurality of columns.

The pixel array may further include a first row control line connected to pixels from among the plurality of pixels such that the only pixels the first row control line is connected to are pixels included in a first row from among the plurality or rows, the pixels included in the first row each being configured to begin an exposure period based on a second signal received from the first row control line.

The plurality of pixels may include at least one first pixel, the first pixel being included in the first group of pixels, the first pixel being included in the first row, the first row control line being connected to the first pixel.

Each of the plurality of pixels may include a photodiode configured to accumulate charges in response to light incident on the photodiode; a floating diffusion region; and a transfer transistor configured to control transfer of charges from the photodiode to the floating diffusion region in response to a transfer control signal received at a gate control node of the transfer transistor.

The first group control line may be a first group transfer control line connected to the gate control nodes of the transfer transistors of each pixel in the first group of pixels.

The pixel array of claim 1 may further include a second group control line connected to each pixel of a second group of pixels from among the plurality of pixels, the second group control line being separate from the first group control line; the second group of pixels including pixels from at least two different rows from among the plurality of rows, the second group of pixels being different from the first group of pixels, the second group of pixels each being configured to begin an exposure period based on a second signal received from the group control line.

According to at least one example embodiment of the inventive concepts, a pixel sensor includes a pixel array; and a line driver configured to control the pixel array; the pixel array including a plurality of pixels arranged in a plurality of rows and a plurality of columns, and a group control line connected to each pixel of a first group of pixels from among the plurality of pixels, the first group of pixels including pixels from at least two different rows from among the plurality of rows, the first group of pixels each being configured to begin an exposure period based on a first signal received from the line driver through the group control line, the exposure period being a period during which a pixel accumulates charges in response to light incident on the pixels.

The pixel array may further include a plurality of column lines corresponding to the plurality of columns, respectively, the plurality of column lines being configured to output image data received from pixels of the columns to which the plurality of column lines correspond.

The pixel array may be arranged such that no two pixels from among the first group of pixels are included in a same column from among the plurality of columns.

The pixel array may further include a first row control line connected to pixels from among the plurality of pixels such that the only pixels the first row control line is connected to are pixels included in a first row from among the plurality or rows, the pixels included in the first row each being configured to begin an exposure period based on a second signal received from the first row control line.

The plurality of pixels may include at least one first pixel, the first pixel being included in the first group of pixels, the first pixel being included in the first row, the first row control line being connected to the first pixel.

Each of the plurality of pixels may include a photodiode configured to accumulate charges in response to light incident on the photodiode; a floating diffusion region; and a transfer transistor configured to control transfer of charges from the photodiode to the floating diffusion region in response to a transfer control signal received at a gate control node of the transfer transistor.

The first group control line may be a first group transfer control line connected to the gate control nodes of the transfer transistors of each pixel in the first group of pixels.

The pixel array may further include a second group control line connected to each pixel of a second group of pixels from among the plurality of pixels, the second group control line being separate from the first group control line, the second group of pixels including pixels from at least two different rows from among the plurality of rows, the second group of pixels being different from the first group of pixels, the second group of pixels each being configured to begin an exposure period based on a second signal received from the group control line.

According to at least one example embodiment of the inventive concepts, a method of controlling a pixel array, the pixel array including a plurality of pixels arranged in a plurality of rows and a plurality of columns, and a group control line connected to each pixel of a first group of pixels from among the plurality of pixels, the first group of pixels including pixels from at least two different rows from among the plurality of rows, includes controlling the pixel array to output a frame of image data by, controlling each row of pixels, from among the plurality of rows, to capture and output image data sequentially beginning with an initial row from among the plurality of rows and ending with a last row from among the plurality of rows, and controlling the first group of pixels capture and output image data a plurality of times to generate a plurality of sub sampled images, respectively, in between a first time point and a second time point, the first time point being when the initial row captures and outputs image data during the output of the frame of image data, the second point being when the last row captures and outputs image data during the output of the frame of image data.

The plurality of sub sampled images may include a first sub sampled image and a second sub sampled image, the first sub sampled image being generated using a first exposure period for the first group of pixels, the second sub sampled image being generated using a second exposure period for the first group of pixels, the first and second exposure periods having different lengths.

The method may further include analyzing image characteristics of the first sub sampled image; and determining a length of the second exposure period based on the analysis.

The method may further include analyzing image characteristics of the first sub sampled image; and performing, based on the analysis, at least one of an auto exposure operation, a motion detection operation, or an auto focus operation.

BRIEF DESCRIPTION OF THE DRAWINGS

Example embodiments will become more appreciable through the description of the drawings in which:

FIG. 4 illustrates an example pixel row readout order according to at least one example embodiment.

DETAILED DESCRIPTION

Figure 1:
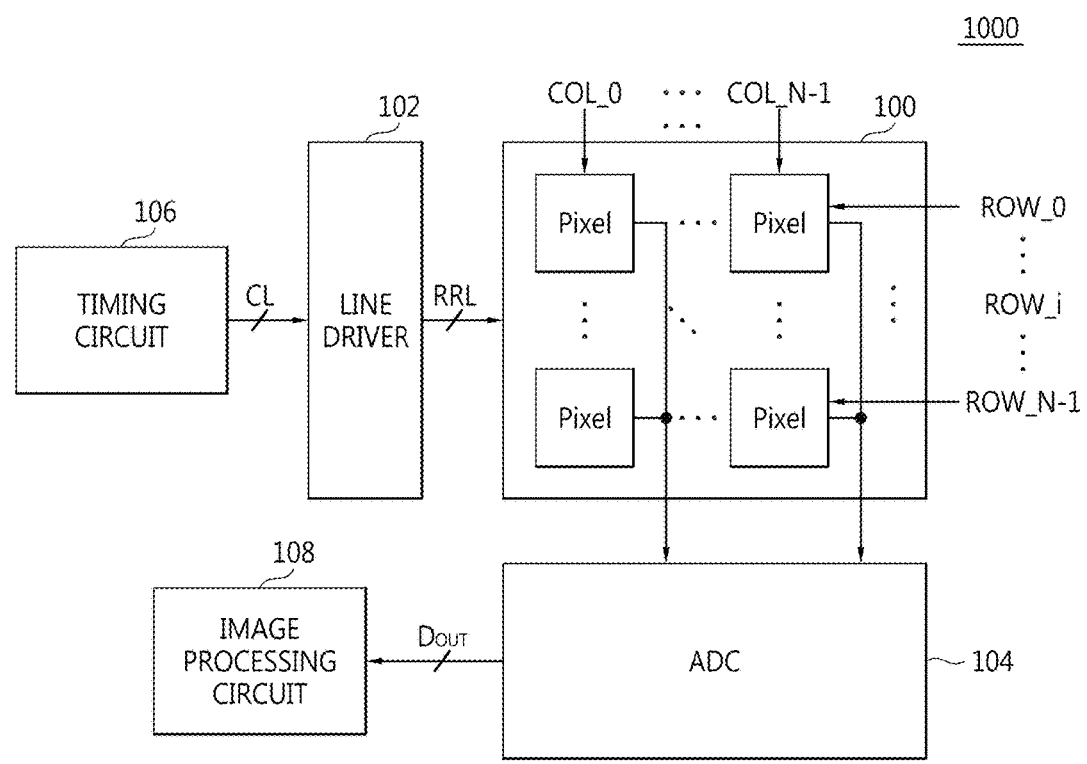
FIG. 1 is a block diagram illustrating an image sensor according to at least one example embodiment.

Example embodiments will now be described more fully with reference to the accompanying drawings. Many alternate forms may be embodied and example embodiments should not be construed as limited to example embodiments set forth herein. In the drawings, like reference numerals refer to like elements.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware in existing electronic systems (e.g., electronic imaging systems, image processing systems, digital point-and-shoot cameras, personal digital assistants (PDAs), smartphones, tablet personal computers (PCs), laptop computers, etc.). Such existing hardware may include one or more Central Processing Units (CPUs), digital signal processors (DSPs), application-specific-integrated-circuits (ASICs), field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible or non-transitory machine readable mediums for storing information. The term "computer-readable medium" may include, but is not limited to, portable or fixed storage devices, optical storage devices, and various other tangible or non-transitory mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors may be programmed to perform the necessary tasks, thereby being transformed into special purpose processor(s) or computer(s).

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc., may be passed, forwarded, or transmitted via any suitable means including memory sharing, message passing, token passing, network transmission, etc.

One or more example embodiments provide an image sensor including a pixel array. The pixel array may be, for example, an active pixel sensor (APS) array for a complementary-metal-oxide-semiconductor (CMOS) image sensor.

As is discussed above, in conventional image signal processors, there are several algorithms which rely on readout frame statistics to make decisions for next frame parameters (e.g. Auto exposure, Auto Flicker, Auto Focus). These algorithms may include analyzing the pixel characteristics of a current frame in order to learn whether frame parameters should be changed in order to improve image quality for the next frame.

However, the above-referenced process may result in several frames of delay for convergence. For example, a particular image processing or correction algorithm might not predict accurately what the results of changing a particular parameter will be, and thus, the algorithm may require analysis of the pixel characteristics of a few frames in order to obtain optimal results.

For example, in order to find the optimal exposure time, it may be desirable for an exposure time optimization algorithm to gather statistics of pixel characteristics with respect to a current frame and define the target exposure level for the next frame based on these statistics. However, in order to reach the optimal value, it may be necessary to gather pixel characteristics from a plurality of frames.

Another example is related to motion algorithm, where it may be necessary, as part of a motion compensation algorithm, to monitor pixel characteristics of several frames in order to make a decision about motion trends in the image, and to determine a suitable motion compensation action.

At least one method of estimating motion for cases where a rolling shutter sensor is used relies on image processing between frames, but may be suffer from frame delay. Accordingly, for a motion estimation algorithm that can benefit from multiple iterations of pixel characteristics, it may be useful to have multiple sub sampled images in order to accelerate the motion estimation processing.

According to one or more example embodiments, a pixel array may be structured such that multiple sub sampled images may be provided during the course of capturing and reading the image of a single frame using, for example, a rolling shutter method.

According to at least some example embodiments, sub sampling of a pixel array can be achieved by reading the values of pixels of special pixel groups simultaneously, where the special pixel groups include pixels located amongst multiple rows and multiple columns of the pixel array.

Example embodiments also provide image sensors and electronic systems including pixel (e.g., APS) arrays, and methods for capturing images.

FIG. 1 is a block diagram of an image sensor 1000 according to an example embodiment. In the example shown in FIG. 1, the image sensor 1000 is a complementary-metal-oxide-semiconductor (CMOS) image sensor. However, example embodiments are not limited to this example.

Referring to FIG. 1, a timing circuit 106 controls a line driver 102 through one or more control lines CL. In one example, the timing circuit 106 causes the line driver 102 to generate a plurality of transfer pulses (e.g., reset/shutter, sampling, readout, and/or selection). The line driver 102 outputs the transfer pulses to a pixel array 100 over a plurality of read and reset lines RRL. The read and reset lines RRL may include transfer lines, sampling lines, reset lines, and selection lines.

The pixel array 100 includes a plurality of pixels arranged in an array of rows ROW_0, ..., ROW_i, ..., ROW_N−1 and columns COL_0, ..., COL_i, ..., COL_N−1. As discussed herein, rows and columns may be collectively referred to as lines. Each of the plurality of read and reset lines RRL corresponds to a line of pixels in the pixel array 100 having a Bayer color pattern. In the example embodiment shown in FIG. 1, each pixel is an active-pixel sensor (APS), and the pixel array 100 is an APS array.

As is known, in the Bayer color pattern, 'R' represents a pixel for sensing red color light, and 'B' represents a pixel for sensing blue color light. 'Gb' represents a pixel for sensing green color light in a row having alternating green and blue pixels, and 'Gr' represents a pixel for sensing green color light in a row having alternating green and red pixels.

Still referring to FIG. 1, the analog-to-digital converter (ADC) 104 converts the output pixel data (e.g., voltages)

from the i-th line ROW_i of readout pixels into a digital signal (also referred to herein as image data). The ADC 104 then outputs the image data to the image processing circuit 108. The image processing circuit 108 performs further processing so as to generate an image to be displayed on a display device (e.g., monitor, etc.) and/or stored in a memory (not shown).

According to at least one example embodiment, pixel circuits of the pixel array 100 may employ a four transistor (4T) structure as will be discussed in greater detail below with reference to FIG. 2A.

Figure 2A:
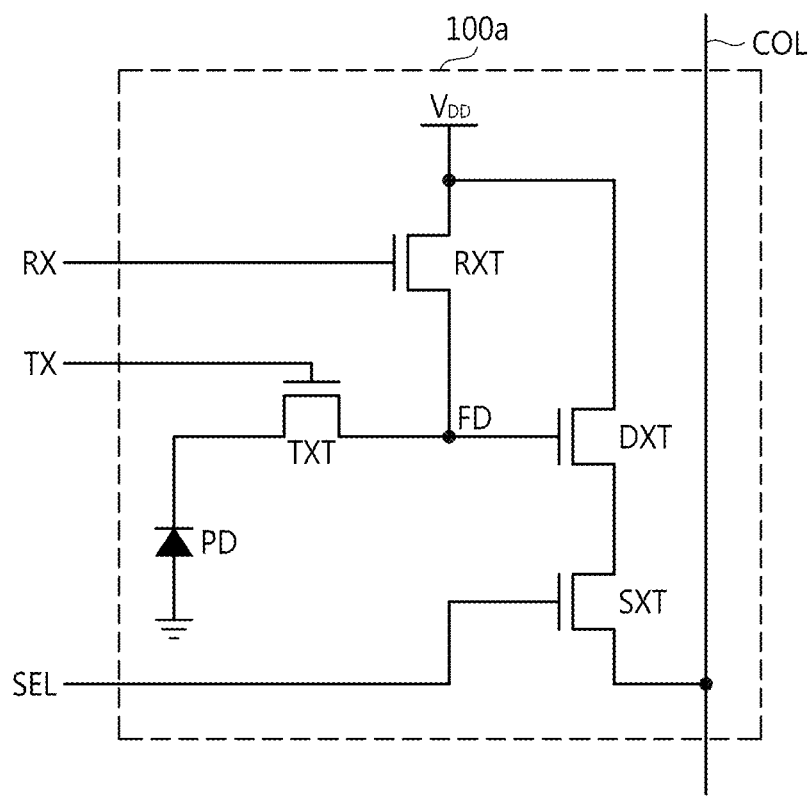
FIG. 2A illustrates an example structure of a pixel circuit according to at least one example embodiment.

FIG. 2A illustrates an example structure of a pixel circuit according to at least one example embodiment.

Referring to FIG. 2A, a pixel 100a includes a photodiode PD, a transfer transistor TXT, a sensing node FD, a reset transistor RXT, a drive transistor DXT, and a select transistor SXT. The transistors TXT, RXT, DXT, and SXT may be, for example, metal-oxide-semiconductor field effect transistors (MOSFETs) or metal-insulator-semiconductor field effect transistors (MISFETs).

The photodiode PD of the pixel 100a may include at least one of a photo transistor, a photo gate, a pinned photodiode (PPD), or a combination thereof.

FIG. 2A shows a 4-transistor (4T) circuit structure that includes a single photodiode PD and four transistors TXT, RXT, DXT, and SXT. However, example embodiments of the inventive concepts are not restricted to the example illustrated in FIG. 2A. FIG. 2A also shows column line COL, power supply voltage VDD, reset line RX through which a reset gate control signals are received at the gate control node of the reset transistor RXT, column select line SEL through which selection control signals are received at the gate control node of the select transistor SXT, and transfer line TX through which transfer gate control signals are received at the gate control node of the transfer transistor TXT. For the purpose of simplicity, FIG. 2A illustrates the structure of a pixel circuit for only one example pixel, pixel 100a. However, according to at least one example embodiment, a plurality or, alternatively, all pixels in the pixel array 100 have the circuit structure of pixel 100a illustrated in, an discussed above with respect to, FIG. 2A.

Further, though a 4T pixel circuit is illustrated in FIG. 2A as an example, according to at least some example embodiments of the inventive concepts, some or all pixels in the pixel array 100 may have other known pixel circuit structures as well, including, for example, 3T, 5T and 6T pixel circuit structures.

Referring to FIGS. 1 and 2A, the read and reset lines RRL may include transfer lines TX, sampling lines, reset lines RX, and column selection lines SEL corresponding specifically to each of rows ROW_0-ROW_N-1 of pixel array 100. For example, the read and reset lines RRL may include a transfer line TX corresponding to each of rows ROW_0-ROW_N-1, respectively. The transfer line TX corresponding to a row may be connected to the gates of each transfer transistor TXT of each pixel in the row. Further, the read and reset lines RRL may include a reset line RX corresponding to each of rows ROW_0-ROW_N-1, respectively. The reset line RX corresponding to a row may be connected to the gates of each reset transistor RXT of each pixel in the row. Further, the read and reset lines RRL may include a row select line SEL corresponding to each of rows ROW_0 -ROW_N-1, respectively. The row select line SEL of a row may be connected to the gates of each row select transistor SXT of each pixel in the row. An example structure of the pixel array 100 will now be discussed in greater detail below with reference to FIG. 2B.

Figure 2B:
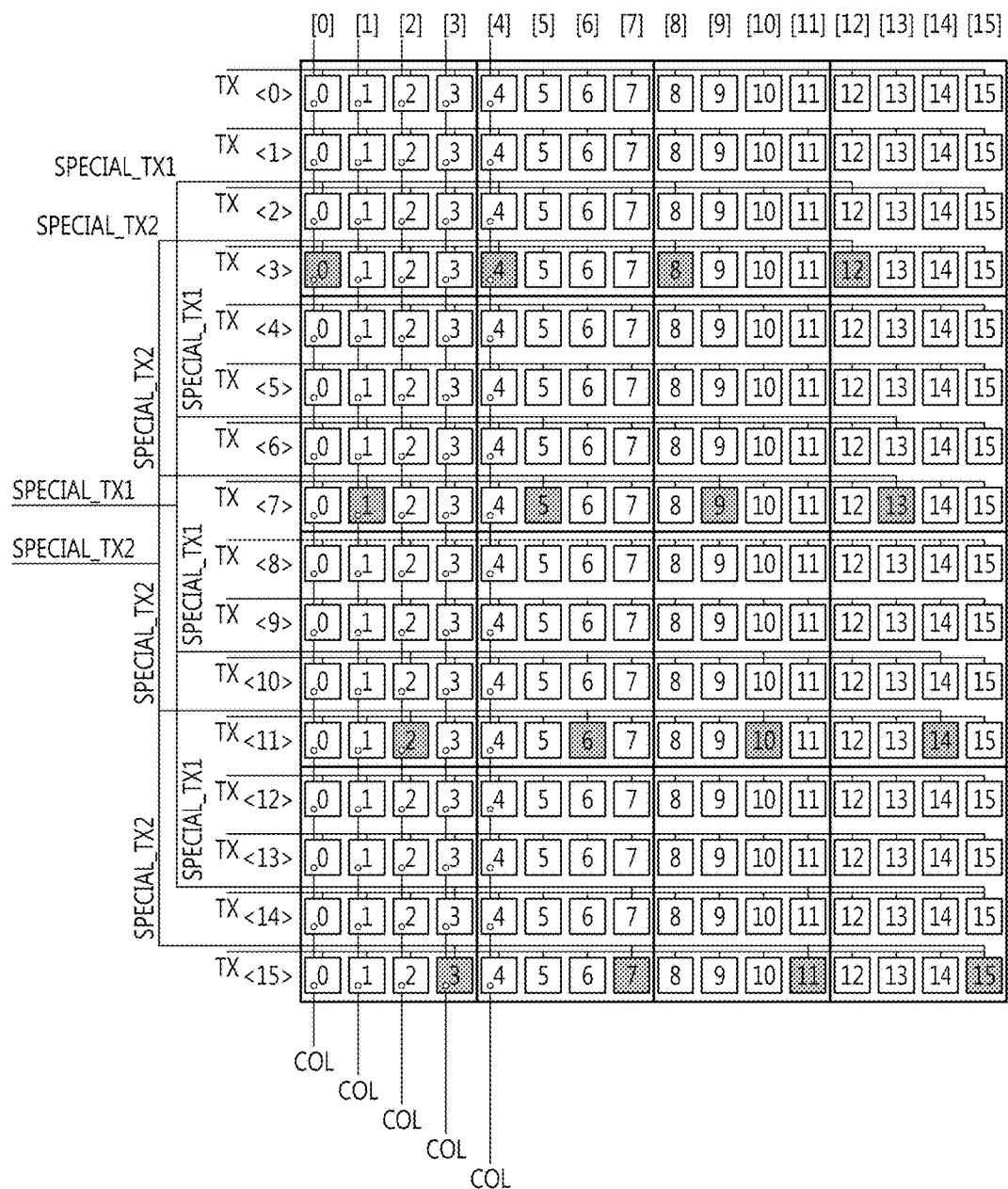
FIG. 2B illustrates an example structure of a pixel array of the image sensor of FIG. 1 according to at least one example embodiment.

FIG. 2B illustrates an example structure of the pixel array 100. For the purpose of simplicity, the pixel array 100 will be explained with respect to an example in which the pixel array 100 is a 16×16 pixel array having pixels arranged in 16 rows of and 16 columns. For the purpose of simplicity, In FIG. 2A, rows ROW_0-ROW_N-1 of FIG. 1 are illustrated as rows <0>-<15>, and columns COL_0-COL_N-1 of FIG. 1 are illustrated as columns [0]-[15].

As is discussed above with respect to FIG. 2A, and illustrated in FIG. 2B, the pixel array 100 includes transfer lines TX corresponding rows <0>-<15>, respectively. Further, as is illustrated in FIG. 2B, the pixel array 100 includes column lines COL. Though column lines are shown only for columns [0]-[4] in FIG. 2B, pixel array 100 includes a column lines COL corresponding to columns [0]-[15], respectively. Thus, during a conventional image capture operation, charges accumulated at the photodiodes PD of each pixel in a row may be transferred from the photodiodes PD to the floating diffusion regions FD of the pixels in response to the transfer transistors TXT of each of the pixels of the row being turned on. Further, data indicating charges stored the floating diffusion regions of every pixel in a particular row can be output through the column lines COL simultaneously. Accordingly, data corresponding to an entire row of pixels can be output, for example to the ADC 104, at the same time through the column lines COL. For example, according to conventional methods, the pixels of row <0> can be controlled to capture image data simultaneously using the transfer line TX of row <0>, and the pixels of row <0> can be controlled to output the captured image data simultaneously using the column lines COL of columns [0]-[15]. The same image data capture and output processes can be performed for each of row <0>-<15> in a sequential (i.e., "rolling") manner such that an image data corresponding to the entirety of the pixel array 100 (i.e., a frame of image data) is captured and output.

Though not illustrated in FIG. 2A for the purpose of simplicity, the pixel array 100 also includes reset signal lines RX and column select lines SEL for each row <0>-<15>, and the signal lines RX and select lines SEL are used along with the transfer lines TX illustrated in FIG. 2B to perform the above-referenced image data capture and output operations.

Further, in accordance with one or more example embodiments of the inventive concepts, in addition to performing image capture and output operations sequentially on each row in a "rolling shutter" manner, the image sensor 1000 is capable of controlling the pixel array 100 to capture sub sample images. Sub sample images formed from the image data corresponding to some, but not all of the pixels in pixel array 100.

Referring to FIG. 2B, according to at least some example embodiments, in addition to organizing pixels in rows and columns, some pixels are also assigned to special pixel groups. A special pixel group is a group of pixels that can be controlled to capture image data simultaneously, and controlled to output the captured image data simultaneously in the same manner discussed above with respect to a row of pixels (e.g., row <0>). FIG. 2B shows two examples special pixel groups, special pixel group 1 and special pixel group 2. Each special pixel group is defined by a special transfer line connected to the special pixel group. For example, special pixel group 1 is illustrated in FIG. 2B as the pixels connected to the first special transfer line SPECIAL_TX1, and special pixel group 2 is illustrated in FIG. 2B as the pixels connected to the first special transfer line SPECIAL_TX2. Though not illustrated, each of the pixels of pixel group 1 are also connected a special reset line SPECIAL_RX1 and a special row select line SPECIAL_SEL1, which are used along with special transfer line SPECIAL_TX1 to perform image data capture and output operations with respect to the pixels of special pixel group 1. Similarly, each of the pixels of pixel group 2 are also connected to a special reset line SPECIAL_RX2 and a special row select line SPECIAL_SEL2, which are used along with special transfer line SPECIAL_TX2 to perform image data capture and output operations with respect to the pixels of special pixel group 2.

In the example illustrated in FIG. 2B, special pixel group 1 includes pixels 0, 4, 8 and 12 from row 2, pixels 1, 5, 9 and 13 from row 6, pixels 2, 6, 10 and 14 from row 10, and pixels 3, 7, 11 and 15 from row 14. In the example illustrated in FIG. 2B, special pixel group 2 includes pixels 0, 4, 8 and 12 from row 3, pixels 1, 5, 9 and 13 from row 7, pixels 2, 6, 10 and 14 from row 11, and pixels 3, 7, 11 and 15 from row 15. The first special pixel group is an example of a 4×4 pixel group pattern because, starting with the row after the uppermost row included in pixel group 1, row <3>, every 4th row is included in pixel group 1. Further, for each row included in pixel group 1, starting with the pixel after the first pixel in each row included in pixel group 1, every $4^{th}$ pixel is included in pixel group 1.

As is illustrated in FIG. 2B, each special pixel group includes a plurality of pixels among different rows of the pixel array 100. For example, special pixel group 1 has pixels in rows 2, 6, 10 and 14, and special pixel group 2 has pixels in rows 3, 7, 11 and 15. As is also illustrated in FIG. 2B, for each special pixel group, none of the special pixel groups include more than one pixel in the same column. For example, in the examples illustrated in FIG. 2B, the column positions of the pixels in special pixel group 1 shift one pixel for each row included in special pixel group 1. The same is true for each row included in special pixel group 2. Consequently, every pixel in pixel group 1 can output image data simultaneously. Similarly, every pixel in pixel group 2 can output image data simultaneously.

Thus, using pixel array 100 according to example embodiments, in addition to capturing and outputting image data row by row in a rolling shutter manner, the image sensor 1000 can also output image data corresponding to a sub sampled image defined by a special pixel group including pixels from multiple columns and multiple rows spreading over a large portion of the pixel array 100. Further, the image data of each pixel of a special pixel group can be obtained simultaneously, like image data of a row of pixels.

Though pixel 100 is illustrated as a 16×16 pixel array for the purpose of simplicity, the pixel array 100 may have any number of rows and any number of pixels in accordance with the desires and capabilities of a manufacturer of the pixel array 100.

For example, the pixel array 100 could have many more than 16 lines (i.e., rows). For pixel sensors having relatively large numbers of lines, it may be desirable to define multiple special pixel groups to provide desirable coverage of the pixel array. For example, for a pixel array that has 4000 rows, the 4000-row pixel array may include 20 special pixel groups each covering 200 rows of the pixel array 200.

For example, each one of the 20 special pixel groups covering the 4000 lines could have, for example, a 20×10 pixel group pattern such that every $20^{th}$ row of the 200 rows covered by the special pixel group is included in the special pixel group, and, for each row included in the special pixel group, every 10th pixel of the row is included in the special pixel group, where the 10-pixel pattern shifts by one pixel for each row included in the special pixel group.

With such an arrangement of 20 special pixel groups, the image senor 1000 could obtain image data of a sub sampled image that spans substantially the full length and width of the 4000-row pixel array by performing only 20 image data capture and output operations (i.e., one image data capture and output operation for each one of the 20 special pixel groups covering the 4000-row pixel array). For example, the sub sampled image generated by the 20 special pixel groups would include pixel data from pixels located on a total of 200 rows. The 200 rows would be substantially evenly spaced among the 4000-row pixel array. Accordingly, the sub sampled image, which covers several different rows and several different columns throughout the 4000-row pixel array, can be obtained in much less time than would be required to perform image data capture and output operations for each row of the 4000-row pixel array.

As used herein, a pixel being included in a special pixel group refers to a pixel that is a member of the special pixel group, and a row being included in a special pixel group refers to a row having at least one pixel that is a member of the special pixel group.

As example manner in which a rolling shutter image capture operation is performed using the image sensor 100 will now be discussed in greater detail below with reference to FIG. 3.

Figure 3:
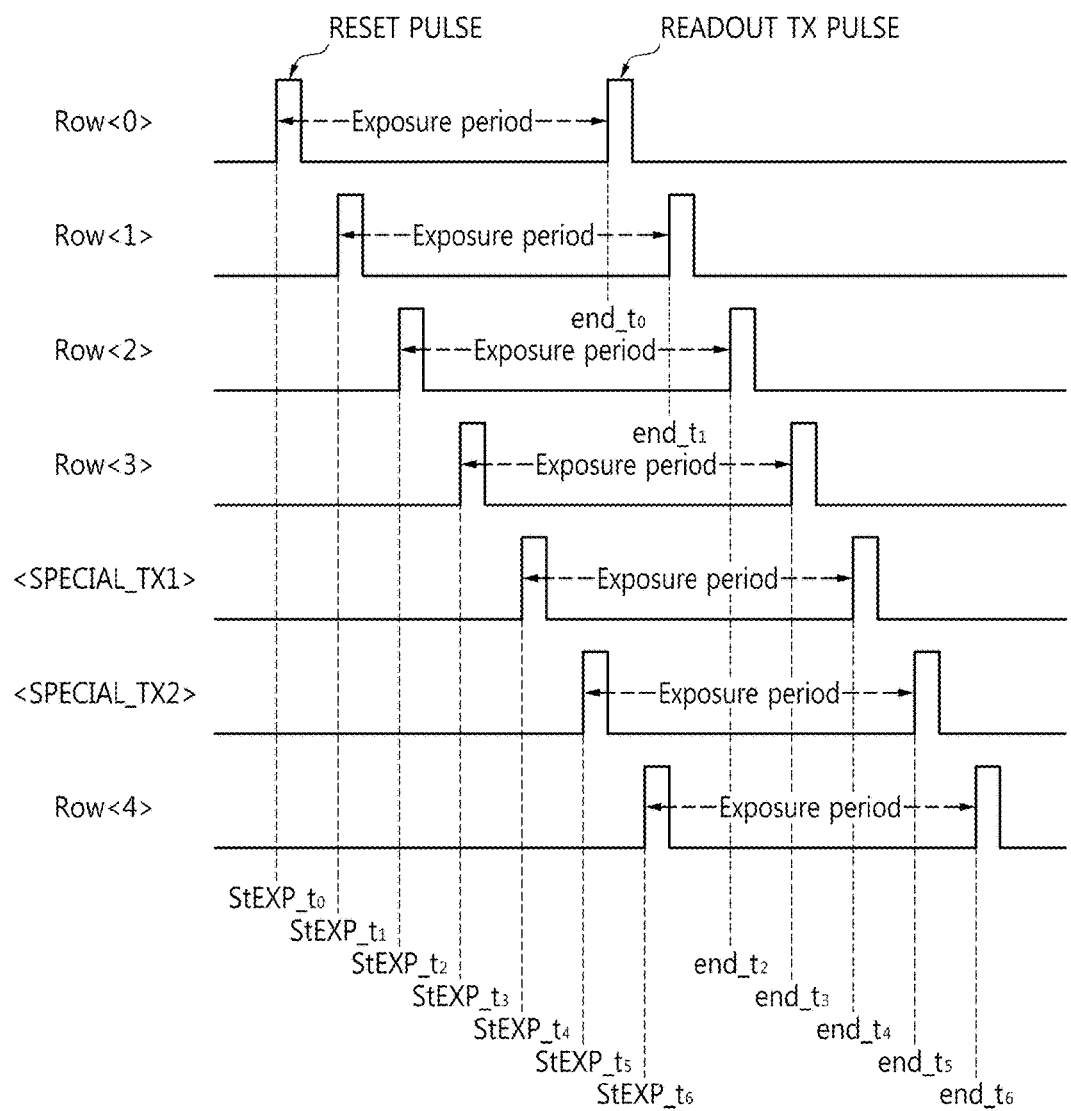
FIG. 3 is a timing diagram for illustrating example operation of the pixel array 100 according to at least one example embodiment.

FIG. 3 is a timing diagram for illustrating an example operation of the pixel array 100 according to at least one example embodiment. FIG. 3 is a timing diagram for describing example operation of the pixel array 100 during an exposure period (also sometimes referred to as an integration period).

The timing diagram shown in FIG. 3 illustrates transfer pulses applied to transfer lines TX that are electrically connected to the pixel array 100 shown in FIG. 1.

Referring to FIG. 3, according to at least one example embodiment the line driver 102 triggers exposure (and start of the exposure period or interval) of the pixel array 100 by sequentially applying a reset transfer pulse (also referred to as a reset pulse or a shutter pulse) to transfer lines TX or rows <0>, <1>, <2> and <3> of pixel sensor 100. Further, the line driver 102 continues by sequentially applying a reset transfer pulse to the transfer line of special pixel group 1 SPECIAL_TX1 and the transfer line of special pixel group 2 SPECIAL_TX2, thereby triggering exposure for the pixels includes in special pixel group one and special pixel group 2. Further, the line driver 102 continues by sequentially applying a reset transfer pulse to the transfer line TX of row <4> of pixel sensor 100, thereby triggering exposure for the pixels included in row <4> of the pixel array 100. As is illustrated in FIG. 3, a reset transfer pulses are applied to the transfer lines of special pixel groups 1 and 2 in the same manner by which reset transfer pulses are applied to transfer lines of rows <0>, <1>, <2>, <3>, and <4>.

During the exposure period, the photodiodes at each pixel produce and accumulate charges in response to incident light to generate image data later used to obtain an image. During the exposure period, the reset transistors RXT of the pixels for which exposure has been triggered may be maintained in the ON state by applying a logic high signal to the reset lines RX connected to the pixels for which exposure has been triggered, whereas the select lines SEL connected to the pixels for which exposure has been triggered may be maintained at a logic low level such that the select transistors SXT of the pixels for which exposure has been triggered remain in the OFF state.

In more detail, at time $StEXP\_t_0$ the line driver 102 applies a reset transfer pulse to the transfer lines TX of row <0> to initiate an exposure period for pixels of row <0> of the pixel array 100; at time $StEXP\_t_1$ the line driver 102 applies a reset transfer pulse to the transfer lines TX of row <1> to initiate an exposure period for pixels of row <1> of the pixel array 100; at time $StEXP\_t_2$ the line driver 102 applies a reset transfer pulse to the transfer lines TX of row <2> to initiate an exposure period for pixels of row <2> of the pixel array 100; at time $StEXP\_t_3$ the line driver 102 applies a reset transfer pulse to the transfer lines TX of row <3> to initiate an exposure period for pixels of row <3> of the pixel array 100; at time $StEXP\_t$ the line driver 102 applies a reset transfer pulse to the transfer lines SPECIAL_TX1 of special pixel group 1 to initiate an exposure period for pixels of special pixel group 1 of the pixel array 100; at time $StEXP\_t_5$ the line driver 102 applies a reset transfer pulse to the transfer lines SPECIAL_TX2 of special pixel group 2 to initiate an exposure period for pixels of special pixel group 2 of the pixel array 100; at time $StEXP\_t_6$ the line driver 102 applies a reset transfer pulse to the transfer lines TX of row <4> to initiate an exposure period for pixels of row <4> of the pixel array 100.

Still referring to FIG. 3, at time end_to the line driver 102 applies a readout transfer pulse to the transfer line TX pf row <0> to end the exposure period for the pixels connected to the transfer line TX or row <0>, and to transfer charges accumulated in the photodiodes PD of the pixels of row <0> to the floating diffusion regions FD of the pixels of row <0> by turning the transfer transistors TXT of the pixels of row <0> on for the duration of the readout transfer pulse. Concurrently with the application of the readout transfer pulse, the line driver 102 may apply a logic low signal to the reset lines RX of the pixels of row <0> to switch the reset transistors RXT of the pixels of row <0> to the OFF state. A signal generated by the charges in the floating diffusion regions FD of the pixels of row <0> is amplified by the drive transistors DXT of the pixels of row <0>.

Concurrently with, or after applying the readout transfer pulse to the transfer line TX of row <0>, a select pulse is applied to the select lines SEL to switch the select transistors SXT of the pixels of row <0> to the ON state such that a pixel data signals amplified by the drive transistors DXT of row <0> are output to the ADC 104 via column lines COL.

At time $end\_t_1$ the line driver 102 applies a readout transfer pulse to the transfer line TX of row <1> to end the exposure period for the pixels connected to the transfer line TX or row <1>, and to transfer charges accumulated in the photodiodes PD of the pixels of row <1> to the floating diffusion regions FD of the pixels of row <1> by turning the transfer transistors TXT of the pixels of row <1> on for the duration of the readout transfer pulse. Concurrently with the application of the readout transfer pulse, the line driver 102 may apply a logic low signal to the reset lines RX of the pixels of row <1> to switch the reset transistors RXT of the pixels of row <1> to the OFF state. A signal generated by the charges in the floating diffusion regions FD of the pixels of row <1> is amplified by the drive transistors DXT of the pixels of row <1>.

Concurrently with, or after applying the readout transfer pulse to the transfer line TX of row <1>, a select pulse is applied to the select lines SEL to switch the select transistors SXT of the pixels of row <1> to the ON state such that a pixel data signals amplified by the drive transistors DXT of row <1> are output to the ADC 104 via column lines COL.

At time $end\_t_2$ the line driver 102 applies a readout transfer pulse to the transfer line TX of row <2> to end the exposure period for the pixels connected to the transfer line TX or row <2>, and to transfer charges accumulated in the photodiodes PD of the pixels of row <2> to the floating diffusion regions FD of the pixels of row <2> by turning the transfer transistors TXT of the pixels of row <2> on for the duration of the readout transfer pulse. Concurrently with the application of the readout transfer pulse, the line driver 102 may apply a logic low signal to the reset lines RX of the pixels of row <2> to switch the reset transistors RXT of the pixels of row <2> to the OFF state. A signal generated by the charges in the floating diffusion regions FD of the pixels of row <2> is amplified by the drive transistors DXT of the pixels of row <2>.

Concurrently with, or after applying the readout transfer pulse to the transfer line TX of row <2>, a select pulse is applied to the select lines SEL to switch the select transistors SXT of the pixels of row <2> to the ON state such that a pixel data signals amplified by the drive transistors DXT of row <2> are output to the ADC 104 via column lines COL.

At time $end\_t_3$ the line driver 102 applies a readout transfer pulse to the transfer line TX of row <3> to end the exposure period for the pixels connected to the transfer line TX or row <3>, and to transfer charges accumulated in the photodiodes PD of the pixels of row <3> to the floating diffusion regions FD of the pixels of row <3> by turning the transfer transistors TXT of the pixels of row <3> on for the duration of the readout transfer pulse. Concurrently with the application of the readout transfer pulse, the line driver 102 may apply a logic low signal to the reset lines RX of the pixels of row <3> to switch the reset transistors RXT of the pixels of row <3> to the OFF state. A signal generated by the charges in the floating diffusion regions FD of the pixels of row <3> is amplified by the drive transistors DXT of the pixels of row <3>.

Concurrently with, or after applying the readout transfer pulse to the transfer line TX of row <3>, a select pulse is applied to the select lines SEL to switch the select transistors SXT of the pixels of row <3> to the ON state such that a pixel data signals amplified by the drive transistors DXT of row <3> are output to the ADC 104 via column lines COL.

At time $end\_t_4$ the line driver 102 applies a readout transfer pulse to the transfer line SPECIAL_TX1 of special pixel group 1 to end the exposure period for the pixels connected to the transfer line TX or special pixel group 1, and to transfer charges accumulated in the photodiodes PD of the pixels of special pixel group 1 to the floating diffusion regions FD of the pixels of special pixel group 1 by turning the transfer transistors TXT of the pixels of special pixel group 1 on for the duration of the readout transfer pulse. Concurrently with the application of the readout transfer pulse, the line driver 102 may apply a logic low signal to the reset lines RX of the pixels of special pixel group 1 to switch the reset transistors RXT of the pixels of special pixel group 1 to the OFF state. A signal generated by the charges in the floating diffusion regions FD of the pixels of special pixel group 1 is amplified by the drive transistors DXT of the pixels of special pixel group 1.

Concurrently with, or after applying the readout transfer pulse to the transfer line SPECIAL_TX1 of special pixel group 1, a select pulse is applied to the select lines SEL to switch the select transistors SXT of the pixels of special pixel group 1 to the ON state such that a pixel data signals amplified by the drive transistors DXT of special pixel group 1 are output to the ADC 104 via column lines COL.

At time $end\_t_5$ the line driver 102 applies a readout transfer pulse to the transfer line SPECIAL_TX2 of special pixel group 2 to end the exposure period for the pixels connected to the transfer line TX or special pixel group 2, and to transfer charges accumulated in the photodiodes PD of the pixels of special pixel group 2 to the floating diffusion regions FD of the pixels of special pixel group 2 by turning the transfer transistors TXT of the pixels of special pixel group 2 on for the duration of the readout transfer pulse. Concurrently with the application of the readout transfer pulse, the line driver 102 may apply a logic low signal to the reset lines RX of the pixels of special pixel group 2 to switch the reset transistors RXT of the pixels of special pixel group 2 to the OFF state. A signal generated by the charges in the floating diffusion regions FD of the pixels of special pixel group 2 is amplified by the drive transistors DXT of the pixels of special pixel group 2.

Concurrently with, or after applying the readout transfer pulse to the transfer line SPECIAL_TX2 of special pixel group 2, a select pulse is applied to the select lines SEL to switch the select transistors SXT of the pixels of special pixel group 2 to the ON state such that a pixel data signals amplified by the drive transistors DXT of special pixel group 2 are output to the ADC 104 via column lines COL.

At time end_$t_6$ the line driver 102 applies a readout transfer pulse to the transfer line TX of row <4> to end the exposure period for the pixels connected to the transfer line TX or row <4>, and to transfer charges accumulated in the photodiodes PD of the pixels of row <4> to the floating diffusion regions FD of the pixels of row <4> by turning the transfer transistors TXT of the pixels of row <4> on for the duration of the readout transfer pulse. Concurrently with the application of the readout transfer pulse, the line driver 102 may apply a logic low signal to the reset lines RX of the pixels of row <4> to switch the reset transistors RXT of the pixels of row <4> to the OFF state. A signal generated by the charges in the floating diffusion regions FD of the pixels of row <4> is amplified by the drive transistors DXT of the pixels of row <4>.

Concurrently with, or after applying the readout transfer pulse to the transfer line TX of row <4>, a select pulse is applied to the select lines SEL to switch the select transistors SXT of the pixels of row <4> to the ON state such that a pixel data signals amplified by the drive transistors DXT of row <4> are output to the ADC 104 via column lines COL.

For the purpose of simplicity, FIG. 3 illustrates signal timings of transfer line TX pulses with respect to only rows <0>-<4> and special pixel groups 1 and 2. However, the same operations discussed above with respect to rows <0>-<4> may be performed by the image sensor 1000 with respect to all of rows <0>-<15> of pixel array 100.

Further, during an operation of capturing and outputting image data of an entire frame (e.g., data from the pixels of all of rows <0>-<15>), sub sample images corresponding to special pixel groups can be captured multiple times as is shown in FIG. 4.

FIG. 4 illustrates an example pixel row readout order according to at least one example embodiment.

In the Example illustrated in FIG. 4, a rolling shutter image capture operation includes performing an image data capture and output operations sequentially in the following order: the 16 pixels of row <0>, the 16 pixels of row <1>, the 16 pixels of row <2>, the 16 pixels of row <3>, the 16 pixels of special pixel group 1, the 16 pixels of special pixel group 2, the 16 pixels of row <4>, the 16 pixels of row <5>, the 16 pixels of row <6>, the 16 pixels of row <7>, the 16 pixels of special pixel group 1, the 16 pixels of special pixel group 2, the 16 pixels of row <8>, the 16 pixels of row <9>, the 16 pixels of row <10>, the 16 pixels of row <11>, the 16 pixels of special pixel group 1, the 16 pixels of special pixel group 2, the 16 pixels of row <12>, the 16 pixels of row <13>, the 16 pixels of row <14>, the 16 pixels of row <15>, the 16 pixels of special pixel group 1, the 16 pixels of special pixel group 2. Accordingly, during the operation of capturing and outputting an image of a single frame, sub sampled images corresponding to special pixel group 1 and special pixel group 2 are captured and output 4 times each. Sub sample images corresponding to special pixel groups can be captured and output as many times per frame as an operator or manufacturer of the image sensor 1000 desires, thereby generating multiple sub sampled images per frame.

The technology of multiple sub sampled images embedded within the single frame, according to at least some example embodiments of the inventive concepts, provides the flexibility of using several sub sampled images with new parameters applied within the full frame readout. As a result, various image processing and/or correction algorithms may gather more pixel characteristic statistics information based on several sub sampled frames, choose the proper image capturing parameters and, apply the chose parameters immediately for a next frame, without the need for a time consuming convergence process spanning many frames.

As is illustrated in FIG. 2B, the pixel array 100 may be include a plurality of macro blocks. For example, the pixels of pixel array 100 are arranged in 4×4 pixel macro blocks as illustrated by the boxes surrounding groups of 16 pixels in FIG. 2B. Further, each macro block may include 1, 2, or more pixels that are members of a special pixel group.

According to at least one example embodiment of the inventive concepts, a number of pixels included in a special pixel group is equal to a number of column lines in a pixel array such that all pixels which that are connected to a special line of the special pixel group compose a full line readout covering all columns. The term special line control refers to the RRL lines (e.g., transfer lines TX, reset lines RX, column select lines SEL) of a special pixel group. For example the special line control of special pixel group 1 of pixel array 100 includes transfer lines SPECIAL_TX1, reset lines SPECIAL_RX1, and column select lines SPECIAL_SEL1.

Though, in the example illustrated in FIG. 2B, there are only 2 different special pixel groups, special pixel group 1, and special pixel group 2, there may be fewer (e.g., 1) or more (e.g., 4 or 5) special pixel groups in pixel array 100. The number of special groups selected for readout may vary according to a desired density of special pixels per unit area of the pixel array 100.

As is illustrated in FIG. 4, during rolling scanning (either exposure start or readout) the special pixel groups are accessed several times during the frame at a given frequency. The time difference between each readout of the subs sample image of each special pixel group is set in accordance with the desires of a user or manufacturer of the image sensor 100 and may be set uniformly or not according to image processing/correcting algorithm needs.

The sub sampled images corresponding to the special pixel group of the pixel array 100 may be used for various algorithms, such as auto exposure convergence and motion detection. For the case of auto exposure, it may be desirable to use sub sampled images to have different exposure samples, meaning that each sub sampled image may have a different exposure time (e.g. capturing a sub sampled image with exposure time 1 after readout of the first 10 rows, capturing a sub sampled image with exposure time 2 after readout of the first 20 rows, capturing a sub sampled image with exposure time 3 after readout of the first 30 rows, etc.), thereby facilitating the determination of an improved, or alternatively, optimal exposure time for a next frame.

For the case of motion detection it may be desirable to use a few sub sampled images in order to compare and search for any evidence for motion in an image scene.

Another example may be to utilize the pixels of the special pixel groups as phase detection auto focus (AF) type pixels, which are commonly used for acceleration of AF convergence. As a result, an AF algorithm may benefit from access to several image samples within one frame to judge about the right AF movement to apply.

Moreover, phase detection AF pixels may have a separate integration time from the conventional pixels which may be very helpful to obtain a better image for AF algorithm processing.

Though special pixel groups of the pixel array 100 are discussed above primarily with reference to examples where a rolling shutter image capture method is employed, according to at least some example embodiment of the inventive concepts, special pixel groups of the pixel array 100 may also be used with a global shutter image capture method, where all of the pixels of the subsampled image or images may all be exposed at the same time.

Figure 5:
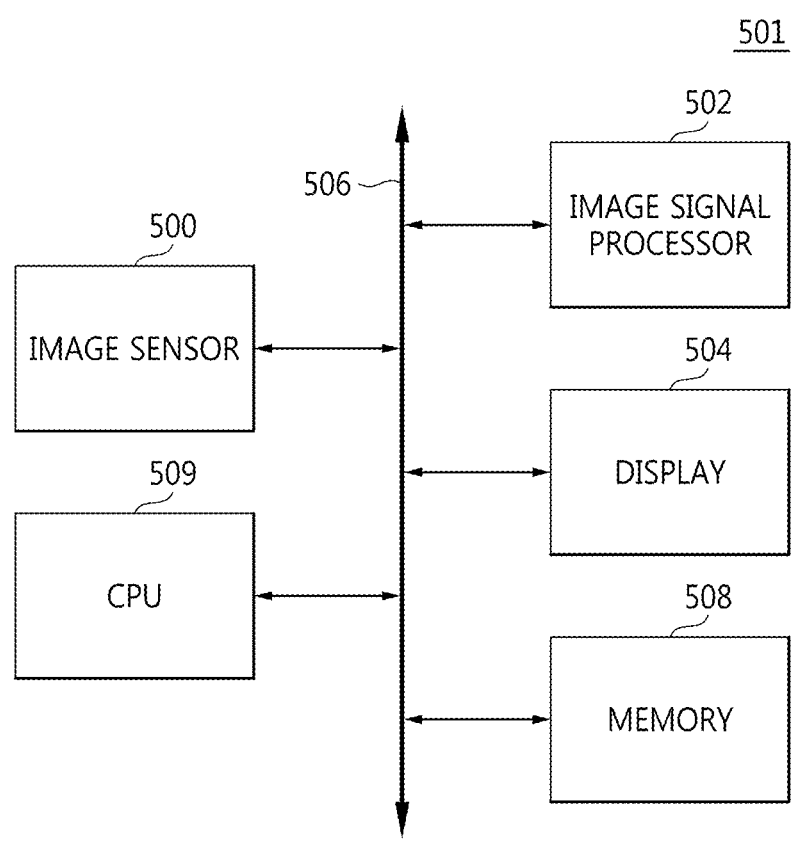
FIG. 5 is a block diagram illustrating an electronic system according to at least one example embodiment.

FIG. 5 is a block diagram illustrating an electronic system according to an example embodiment.

Referring to FIG. 5, an electronic system 501 includes: an image sensor 500; an image signal processor (ISP) 502; a display 504; a memory 508, and a central processing unit (CPU) 509. The image sensor 500, the ISP 502, the display 504, the memory 508 and the CPU 509 communicate with one another via a bus 506.

The image sensor 500 may be an image sensor according to example embodiments described herein. For example, the image sensor 500 may be embodied by the image sensor 1000 discussed above with reference to FIGS. 1-4. The image sensor 500 is configured to capture image data by converting optical images into electrical signals. The electrical signals are output to the ISP 502.

The ISP 502 processes the captured image data for storage in the memory 508 and/or display by the display 504. In more detail, the ISP 502 is configured to: receive digital image data from the image sensor 500; perform image processing operations on the digital image data; and output a processed image or processed image data. The ISP 502 may be or include the image processing circuit 108 shown in FIG. 1.

The CPU 509 is a hardware-implemented data processing device having circuitry that is physically structured to execute desired operations including, for example, operations represented as code and/or instructions included in a program.

The CPU 509 may also be configured to execute a program and control the electronic imaging system. The program code to be executed by the CPU 509 may be stored in the memory 508. The memory 508 may also store the image data and/or images acquired by the image sensor and processed by the ISP 502. The memory 508 may be any suitable volatile or non-volatile memory.

According to at least one example embodiment, the CPU 509 and ISP 502 may be implemented together as elements of an application processor (AP) of the electronic system 501.

According to at least one example embodiment, operations described herein as being performed by the image sensor 1000 are controlled by the CPU 509 and or AP of the electronic system 501.

Alternatively, according to at least one example embodiment, operations described herein as being performed by the image sensor 1000 are controlled by a hardware-implemented processor (not illustrated) that is located in the image sensor 1000 and controls operations of one or more of the pixel array 100, the line driver 102, the timing circuit 106, the ADC 104, or the image processing circuit 108.

The electronic system 501 shown in FIG. 5 may be connected to an external device (e.g., a personal computer or a network) through an input/output device (not shown) and may exchange data with the external device.

The electronic system shown in FIG. 5 may embody various electronic control systems including an image sensor, such as a digital still camera. Moreover, the electronic system may be used in, for example, mobile phones, personal digital assistants (PDAs), laptop computers, netbooks, MP3 players, navigation devices, household appliances, or any other device utilizing an image sensor or similar device.

The foregoing description of example embodiments has been provided for purposes of illustration and description. It is not intended to be exhaustive or limiting. Individual elements or features of a particular example embodiment are generally not limited to that particular example embodiment. Rather, where applicable, individual elements or features are interchangeable and may be used in a selected embodiment, even if not specifically shown or described. The same may also be varied in many ways. All such modifications are intended to be included within the scope of this disclosure.

What is claimed is:

1. A pixel array comprising:
   a plurality of pixels arranged in a plurality of rows and a plurality of columns;
   a first group control line connected to each pixel of a first group of pixels from among the plurality of pixels; and
   a row control line connected to one or more pixels from among the first group of pixels,
   the first group of pixels including pixels from at least two different rows from among the plurality of rows,
   the first group of pixels each being configured to begin a first exposure period based on a first signal received from the first group control line,
   the one or more pixels from among the first group of pixels each being further configured to begin a second exposure period based on a second signal received from the row control line,
   the first exposure period being a period during which the first group of pixels accumulate charges in response to incident light,
   the second exposure period being a period during which the one or more pixels from among the first group of pixels accumulate charges in response to incident light.

2. The pixel array of claim 1, further comprising:
   a plurality of column lines corresponding to the plurality of columns, respectively,
   the plurality of column lines being configured to output image data received from pixels of the columns to which the plurality of column lines correspond.

3. The pixel array of claim 2, wherein no two pixels from among the first group of pixels are included in a same column from among the plurality of columns.

4. The pixel array of claim 1, wherein the row control line is a first row control line that is connected to pixels from among the plurality of pixels such that the only pixels the first row control line is connected to are pixels included in a first row from among the plurality of rows, the pixels included in the first row each being configured receive the second signal from the first row control line and begin the second exposure period based on the second signal.

5. The pixel array of claim 4, wherein the plurality of pixels includes at least one first pixel,
the first pixel being included in the first group of pixels,
the first pixel being included in the first row,
the first row control line being connected to the first pixel.

6. The pixel array of claim 1, wherein each of the plurality of pixels comprises:
a photodiode configured to accumulate charges in response to light incident on the photodiode;
a floating diffusion region; and
a transfer transistor configured to control transfer of charges from the photodiode to the floating diffusion region in response to a transfer control signal received at a gate control node of the transfer transistor.

7. The pixel array of claim 6, where in the first group control line is a first group transfer control line connected to the gate control nodes of the transfer transistors of each pixel in the first group of pixels.

8. The pixel array of claim 1, further comprising:
a second group control line connected to each pixel of a second group of pixels from among the plurality of pixels,
the second group control line being separate from the first group control line,
the second group of pixels including pixels from at least two different rows from among the plurality of rows,
the second group of pixels being different from the first group of pixels,
the second group of pixels each being configured to begin an exposure period based on a second signal received from the second group control line.

9. A pixel sensor comprising:
a pixel array; and
a line driver configured to control the pixel array,
the pixel array including,
a plurality of pixels arranged in a plurality of rows and a plurality of columns,
a first group control line connected to each pixel of a first group of pixels from among the plurality of pixels, and
a row control line connected to one or more pixels from among the first group of pixels,
the first group of pixels including pixels from at least two different rows from among the plurality of rows,
the first group of pixels each being configured to begin a first exposure period based on a first signal received from the line driver through the first group control line,
the one or more pixels from among the first group of pixels each being further configured to begin a second exposure period based on a second signal received from the line driver through the row control line,
the first exposure period being a period during which the first group of pixels accumulate charges in response to incident light,
the second exposure period being a period during which the one or more pixels from among the first group of pixels accumulate charges in response to incident light.

10. The pixel sensor of claim 9, wherein the pixel array further includes a plurality of column lines corresponding to the plurality of columns, respectively,
the plurality of column lines being configured to output image data received from pixels of the columns to which the plurality of column lines correspond.

11. The pixel sensor of claim 10, wherein no two pixels from among the first group of pixels are included in a same column from among the plurality of columns.

12. The pixel sensor of claim 9, wherein the pixel array further includes a first row control line connected to pixels from among the plurality of pixels such that the only pixels the first row control line is connected to are pixels included in a first row from among the plurality of rows,
the pixels included in the first row each being configured to begin an exposure period based on a second signal received from the first row control line.

13. The pixel sensor of claim 12, wherein the plurality of pixels includes at least one first pixel,
the first pixel being included in the first group of pixels,
the first pixel being included in the first row,
the first row control line being connected to the first pixel.

14. The pixel sensor of claim 9, wherein each of the plurality of pixels comprises:
a photodiode configured to accumulate charges in response to light incident on the photodiode;
a floating diffusion region; and
a transfer transistor configured to control transfer of charges from the photodiode to the floating diffusion region in response to a transfer control signal received at a gate control node of the transfer transistor.

15. The pixel sensor of claim 14, where in the first group control line is a first group transfer control line connected to the gate control nodes of the transfer transistors of each pixel in the first group of pixels.

16. The pixel sensor of claim 9, where in the pixel array further includes a second group control line connected to each pixel of a second group of pixels from among the plurality of pixels,
the second group control line being separate from the first group control line,
the second group of pixels including pixels from at least two different rows from among the plurality of rows,
the second group of pixels being different from the first group of pixels,
the second group of pixels each being configured to begin an exposure period based on a second signal received from the second group control line.

17. A method of controlling a pixel array, the pixel array including a plurality of pixels arranged in a plurality of rows and a plurality of columns, and a group control line connected to each pixel of a first group of pixels from among the plurality of pixels, the first group of pixels including pixels from at least two different rows from among the plurality of rows, the method comprising:
controlling the pixel array to output a frame of image data by,
controlling each row of pixels, from among the plurality of rows, to capture and output image data sequentially beginning with an initial row from among the plurality of rows and ending with a last row from among the plurality of rows, and
controlling the first group of pixels capture and output image data a plurality of times to generate a plurality of sub sampled images, respectively, in between a first time point and a second time point,
the first time point being when the initial row captures and outputs image data during the output of the frame of image data,
the second time point being when the last row captures and outputs data during the output of the frame of image data.

18. The method of claim 17 wherein the plurality of sub sampled images includes a first sub sampled image and a second sub sampled image,
- the first sub sampled image being generated using a first exposure period for the first group of pixels,
- the second sub sampled image being generated using a second exposure period for the first group of pixels,
- the first and second exposure periods having different lengths.

19. The method of claim 18 further comprising:
- analyzing image characteristics of the first sub sampled image; and
- determining a length of the second exposure period based on the analysis.

20. The method of claim 18 further comprising:
- analyzing image characteristics of the first sub sampled image; and
- performing, based on the analysis, at least one of an auto exposure operation, a motion detection operation, or an auto focus operation.

* * * * *